United States Patent
Layson (10) Patent No.: US 10,157,188 B2
(45) Date of Patent: Dec. 18, 2018

(54) RELEASED OFFENDER GEOSPATIAL LOCATION INFORMATION CLEARINGHOUSE

(71) Applicant: 3M INNOVATIVE PROPERTIES COMPANY, St. Paul, MN (US)

(72) Inventor: Hoyt M. Layson, Orlando, FL (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/370,179

(22) PCT Filed: Jan. 4, 2013

(86) PCT No.: PCT/US2013/020234
§ 371 (c)(1),
(2) Date: Jul. 1, 2014

(87) PCT Pub. No.: WO2013/103776
PCT Pub. Date: Jul. 11, 2013

(65) Prior Publication Data
US 2014/0344277 A1 Nov. 20, 2014

Related U.S. Application Data

(60) Provisional application No. 61/584,053, filed on Jan. 6, 2012.

(51) Int. Cl.
*G06F 15/16* (2006.01)
*G06F 17/30* (2006.01)
*G08B 21/22* (2006.01)

(52) U.S. Cl.
CPC ....... *G06F 17/30241* (2013.01); *G08B 21/22* (2013.01)

(58) Field of Classification Search
CPC .............. G06F 17/30241; G08B 21/22
(Continued)

(56) References Cited

U.S. PATENT DOCUMENTS 5,204,670 A * 4/1993 Stinton ............... A61B 5/0531
340/10.5
6,031,460 A 2/2000 Banks
(Continued)

FOREIGN PATENT DOCUMENTS

| WO | WO 2008-027948 | 3/2008 |
| WO | WO 2013-103779 | 7/2013 |
| WO | WO 2013-103782 | 7/2013 |

OTHER PUBLICATIONS

Oppen and Dalal, "The Clearinghouse:A decentralized Agent for Locating Named objects in a Distributed Environment", ACM Transactions on Office Information Systems, val. 1, No. 3, Jul. 1983, pp. 230-253.
(Continued)

*Primary Examiner* — Normin Abedin
(74) *Attorney, Agent, or Firm* — Soroker Agmon Nordman (57) ABSTRACT

A clearinghouse for integrating information related to released criminal offenders. The clearinghouse includes a computer system that receives geospatial location information related to released criminal offenders from multiple disparate systems, the geospatial location information including date and time information. The computer system then converts the information to a homogenous data format. The present invention further includes a method of integrating information related to released criminal offenders.

22 Claims, 3 Drawing Sheets

(58) Field of Classification Search
USPC .......................................................... 709/217
See application file for complete search history.

(56) References Cited

U.S. PATENT DOCUMENTS

| | | | |
|---|---|---|---|
| 6,054,928 A | 4/2000 | Lemelson | |
| 6,405,213 B1* | 6/2002 | Layson | G06Q 10/10 |
| | | | 340/539.1 |
| 7,162,237 B1 | 1/2007 | Silver | |
| 7,298,835 B1 | 11/2007 | Perry | |
| 7,455,225 B1* | 11/2008 | Hadfield | G07C 5/085 |
| | | | 235/384 |
| 7,561,065 B2 | 7/2009 | Obradovich | |
| 7,565,157 B1 | 7/2009 | Ortega | |
| 7,577,666 B2 | 8/2009 | Overton | |
| 7,589,628 B1 | 9/2009 | Brady, Jr. | |
| 7,598,855 B2 | 10/2009 | Scalisi | |
| 7,599,795 B1 | 10/2009 | Blumberg | |
| 7,602,277 B1 | 10/2009 | Daly | |
| 7,611,409 B2 | 11/2009 | Muir | |
| 7,616,942 B2 | 11/2009 | Karl | |
| 7,619,533 B2 | 11/2009 | Crucilla | |
| 7,646,296 B2 | 1/2010 | Ohki | |
| 7,647,022 B2 | 1/2010 | Ng | |
| 7,647,047 B2 | 1/2010 | Moghaddam | |
| 7,936,262 B2 | 5/2011 | Derrick | |
| 7,961,092 B2 | 6/2011 | Freathy | |
| 8,009,036 B2 | 8/2011 | Freathy | |
| 8,169,316 B2 | 5/2012 | Freathy | |
| 8,451,131 B2* | 5/2013 | Ghazarian | G08B 21/0258 |
| | | | 340/539.11 |
| 2001/0051853 A1* | 12/2001 | Evans | G08G 1/205 |
| | | | 701/301 |
| 2002/0164979 A1 | 11/2002 | Mooney | |
| 2003/0120424 A1* | 6/2003 | Angwin | G01S 5/02 |
| | | | 701/468 |
| 2004/0113772 A1 | 6/2004 | Hong Chou | |
| 2005/0037730 A1* | 2/2005 | Montague | B60R 25/1004 |
| | | | 455/404.2 |
| 2005/0232249 A1 | 10/2005 | Mishra | |
| 2005/0285747 A1 | 12/2005 | Kozlay | |
| 2006/0183486 A1 | 8/2006 | Mullen | |
| 2007/0159343 A1 | 7/2007 | Crucilla | |
| 2007/0182544 A1 | 8/2007 | Benson | |
| 2008/0103293 A1 | 5/2008 | Cho | |
| 2008/0215627 A1 | 9/2008 | Higgins | |
| 2009/0019367 A1* | 1/2009 | Cavagnari | G06F 21/62 |
| | | | 715/716 |
| 2010/0317317 A1* | 12/2010 | Maier | H04W 64/00 |
| | | | 455/404.2 |
| 2011/0201274 A1 | 8/2011 | Freathy | |
| 2011/0248853 A1 | 10/2011 | Roper | |

OTHER PUBLICATIONS

International Search Report for PCT International Application No. PCT/US2013/020234, dated Apr. 10, 2013, 4 pages.

* cited by examiner

RELEASED OFFENDER GEOSPATIAL LOCATION INFORMATION CLEARINGHOUSE

TECHNICAL FIELD

This disclosure relates to a clearinghouse for geospatial location information, including date and time information, related to released criminal offenders. More specifically, the present disclosure relates to a clearinghouse that receives such information from multiple disparate systems and converts the information into a homogenous data format.

BACKGROUND

Today, released criminal offenders on community supervision, either probation or parole, are monitored by a criminal justice supervising agency, such as a department of corrections or local law enforcement. The monitoring is based on a sentence, and often includes exclusion areas and inclusion areas with a schedule for the day of the week and a range of times associated with those areas when the released criminal offender is required to be or required not to be in those areas. A released criminal offender's geospatial location at a given date and time is monitored and recorded by tracking devices worn by the released criminal offender. This geospatial information, including date and time information, can be used to determine a released criminal offender's compliance with their sentence. Activities of released criminal offenders can be reported to the criminal justice supervising agency or to a probation or parole officer by fax, page, text message or email generated by a monitoring center unique to the criminal justice supervising agency.

Currently, an offender's geospatial location and associated date and time information can be determined by a number of different methods. These methods range from: (1) voice verification whereby an offender calls in by land line to verify his current geospatial location at a given date and time by using caller ID for a wired line phone, (2) radio frequency monitoring whereby the supervised released criminal offender wears a tamper resistant tag that communicates with receivers at a known geospatial location or geospatial locations using short range (i.e. in the range of 100 meters) radio frequency communications, to (3) tamper resistant tracking devices that record or report geospatial location points along with date and time information either in a batch mode or real time mode using a geospatial location, date and time means such as GPS, cellular triangulation, IP (Internet Protocol) address and/or a wired telephone land line caller ID for batch mode, or wireless communications for both real time and batch modes.

Just as multiple systems are used to determine a released criminal offender's geospatial location at a given date and time, multiple databases exist containing released criminal offender geospatial location information along with date and time information. These databases are owned or operated by contracted companies providing released criminal offender monitoring products and services. Or the criminal justice supervising agency may deploy and operate released offender monitoring and reporting devices produced by vendors. These databases are typically disparate in terms of their physical location, operation and reporting mechanisms. These databases are typically heterogeneous in terms of data format since there is no formatting standard for the data collected or stored for supervised released criminal offenders, and there are multiple vendors providing products and services to monitor or locate supervised released criminal offenders. Within a single jurisdiction as small as a city or county, there may be one or more of each type of system described above, each with their own separate unique databases and unique reporting implementations. Disparate systems also typically do not share geospatial location information along with date and time information with each other. A system which reports supervised released criminal offender's geospatial location, date, and time information and movement history to only one of multiple agencies that may benefit from or need such information is known in the art as a stovepipe system. There exists a need for an improved method of monitoring released criminal offenders.

SUMMARY

Stovepipe systems of the status quo can be limiting when sentences for supervised released criminal offenders are general guidelines that are wide in their scope and cross over into adjacent criminal justice supervising agencies territories or jurisdictions. This wide scope and geographic range makes it extremely difficult to detect a violation of the supervised released criminal offender's sentence outside of the supervising agency's jurisdiction, much less enforce the sentence.

As an example, supervised released criminal offenders are often not allowed to be with or within a defined proximity of other supervised released criminal offenders. This sentence only be can be monitored and enforced if geospatial location information along with date and time information for two or more supervised released criminal offenders is collected and managed by a single system, so that the system can correlate the locations of the two released criminal offenders at any time, whether in real time or post mortem. This sentence cannot be monitored and is not enforceable if two or more supervised released criminal offender who come into contact with each other being monitored by different or disparate systems that do not share geospatial location and date and time information about each of the released criminal offenders with each other. A central repository, or clearinghouse, or central repository of supervised released criminal offender geospatial location, date and time data is required to monitor and enforce this particular type of sentence and other sentences that include multiple areas monitored by disparate systems.

Another example relates to predatory offenders such as stalkers, rapists and pedophiles that stalk their victims in order to determine the optimum time and location to perform their predatory crime. Because these supervised released criminal offenders have had and may have sentences preventing association with particular individuals who are potential victims it is currently impossible to define all possible of limit locations for such a sentence. It is even more impossible to monitor and enforce all locations since the off limit locations are enormous in number and the off limit areas are both static and dynamic. For example, a common sentence for pedophiles is that they are not allowed to loiter or sometimes go to locations where children are present or congregate. Knowing the location of the potential victims in this example is required to assure violation detection and enforcement of such a sentence. Currently, only generally known static locations such as schools and playgrounds can be identified, monitored and enforced as exclusion areas for pedophiles. Dynamic areas such as school bus stops cannot be programmed into monitoring systems and devices with supervised released criminal offender because they change each school year.

The result of the disparate systems, the lack of data formatting standards, fragmented reporting and the dynamics of victim and crime opportunity scenarios combine to result in an increased risk to public safety. Further, dynamic exclusion locations and the plurality of static exclusion locations that are unknown to criminal justice supervising agencies make it difficult to effectively monitor supervised released criminal offenders or enforce sentences.

The present invention provides many advantages over the status quo to address many of the limitations of the status quo addressed above. These advantages include data fusion for the supervising authorities of supervised released criminal offenders under community supervision. The present invention also allows collection of geospatial location information, including date and time information, from subscribers to identify dynamic exclusion areas for supervised released criminal offenders. Each of these advantages can result in improving public safety.

In one aspect, the present invention includes a clearinghouse for integrating information related to released criminal offenders. The clearinghouse includes a computer system that receives geospatial location information related to released criminal offenders from multiple disparate systems, where the geospatial location information includes date and time information. The computer system converts the geospatial location information to a homogenous data format.

In another aspect, the present invention includes a method of integrating information related to released criminal offenders. The method includes receiving geospatial location, including date and time information related to released criminal offenders from multiple disparate systems. The method further includes converting the received geospatial location information to a homogenous data format.

BRIEF DESCRIPTION OF DRAWINGS

For a more complete understanding of the present disclosure and its advantages, reference is now made to the following description, taken in conjunction with the accompanying drawings, in which.

The accompanying drawings illustrate various embodiments of the present invention. The embodiments may be utilized, and structural changes may be made, without departing from the scope of the present invention. The figures are not necessarily to scale. Like numbers used in the figures generally refer to like components. However, the use of a number to refer to a component in a given figure is not intended to limit the component in another figure labeled with the same number.

DETAILED DESCRIPTION

Figure 1:
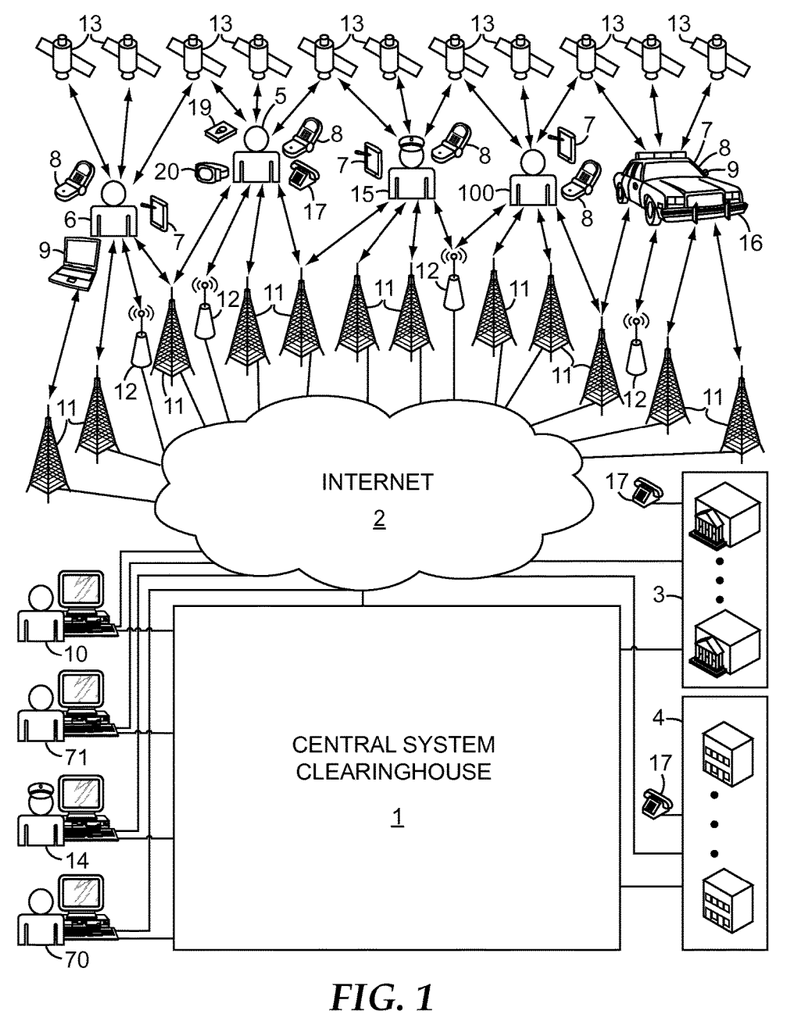
FIG. 1 is a diagram illustrating an exemplary end to end system, including a clearinghouse interfaced to different types of disparate monitoring and data collection systems, and the users of the data produced by the clearinghouse.

FIG. 1 depicts an exemplary end to end system including clearinghouse 1, devices, and people clearinghouse 1 can interface with in such a system. In the illustrated embodiment, clearinghouse 1 is interfaced to people and devices by the internet 2. Further connectivity to the clearinghouse 1 for subscribers 6, probation and parole officers 100 and law enforcement officers 15, 16 using devices 7, 8, 9 is provided by direct connections, wireless cellular 11 or Wifi or WiMax 12 networks using the Internet 2. Direct connections to clearinghouse 1 can be provided for monitoring equipment at supervising agencies 3, monitoring equipment at contracted companies 4, probation and parole officers at supervising agencies 10, law enforcement 14, E911 dispatch 70 and chat operators 71 by connections such as leased lines, x.25, frame relay, etc. Monitoring equipment at supervising agencies 3, monitoring equipment at contracted companies 4, probation and parole officers at supervising agencies 1-, law enforcement 14, E911 dispatch 70 and chat operators 71 may also connect to clearinghouse 1 using the interact 2. Any appropriate connection method or protocol for any of the entities or individuals mentioned above may be used in accordance with the scope of the present disclosure.

Currently, criminal justice supervising agencies 3 and contracted companies 4 provide that monitor a released criminal offender 5 use a variety of tools or devices to determine a released criminal offender's location. Such devices include, for example, land line telephones 17, cellular phones 18, pagers 19, and offender-wont devices 20. These devices use various methods to determine geospatial location at a given date and time. Some devices use wireless 11 triangulation, WiFi 12, IP address, caller ID or satellite 13 triangulation. Some devices are hand carried and some devices are body worn. Some devices provide continuous geospatial location information in real time by using wireless communications while some devices record continuous geospatial information, along with date and time information, and then submit it in a batch mode either wireless or land line communications.

In accordance to the present disclosure, geospatial location information along with date and time information collected by a criminal justice supervising agency 3 or a contracted company 4 are transferred to clearinghouse 1 through the applicable communication link.

Because geospatial location information, along with date and time information, is provided by many different sources, it exists in many heterogeneous formats. When clearinghouse 1 receives the heterogeneous data, a computer system of clearinghouse 1 can convert the data to a homogenous data format. For example, the heterogeneous data can be encapsulated and made homogenous using the capabilities of extended markup language (XML). XML may also be utilized for communication between clearinghouse 1 and systems of criminal justice supervising agencies 3 and contracting companies 4. Any other appropriate method of converting the data to a homogenous format may also be used, as discussed in further detail elsewhere in this disclosure and as would be apparent to one of skill in the art upon reading this disclosure.

Other entities, such as law enforcement vehicles 16 and officers 15 may have systems for identifying or recording geospatial location along with date and time information systems which can also be interfaced to clearinghouse 1. This allows law enforcement vehicles 16 and officers 15 to be located for supervised released criminal offender 5 apprehension and detention for violations of sentences, panic responses from subscribers 6 and threat warnings generated for subscribers 6.

A subscriber 6 can be any individual or entity who is not a supervised released criminal offender. This can include past victims, potential victims, law enforcement personnel and others. Subscribers 6 can also have different levels of interaction with clearinghouse 1. For example, subscribers 6 may be an active part of the clearinghouse 1 system. A subscriber 6 may have a device that regularly interacts with clearinghouse 1 by regularly sending location information to clearinghouse 1 so that clearinghouse 1 actively tracks subscriber 6. Subscriber receive automated push notifications based on particular criteria, subscriber preferences, released criminal offender trend analysis and released criminal offender threat assessment. For example, a subscriber 6 may receive a push notification when subscriber 6 is within a given, predetermined distance of a released criminal offender 5. On the other hand, a subscriber 6 may also interact with the clearinghouse 1 only on a demand or passive, basis. Such a subscriber 6 is a recipient. A recipient typically plays a more passive role when interacting with clearinghouse 1. A recipient may use a device to make queries to the clearinghouse and is able to submit further information related to a released criminal offender 5 identified by the clearinghouse in a response to the recipient's query. The recipient may also provide location information to clearinghouse 1. In some cases, based on released criminal offender 5 trend analysis and thread assessment, clearinghouse 1 may push a notification to a recipient based on the recipient's cumulative queries demonstrating a trend or threat level assessment by a released criminal offender, but clearinghouse 1 will typically not actively track the location of a recipient. There can be other types of subscribers 6 with varying ranges of interaction with clearinghouse 1, but the term subscriber 6 is used generically to describe these individuals.

In the illustrated embodiment, clearinghouse 1 can receive queries from subscribers' 6 devices, such as personal digital assistant (PDA) 7, cellular phone 8, laptop computer 9 or any other device that has the ability to provide a location for subscriber 6 as described herein. For example, any of PDA 7, cellular phone 8, laptop computer 9, or other device with subscriber 6 may have an application that allows the subscriber 6 to send their date stamped and time stamped geospatial location information and demographic data to the clearinghouse 1 either by wireless or wired means. Additional devices that may be used by a subscriber include smart phones, palmtop computers and desk top computers, any of which may allow a subscriber to provide location information, along with date and time information to clearinghouse 1. These devices may communicate with clearinghouse 1, for example, through a Local Area Network (LAN), Integrated Services Digital Network (ISDN), cable or telephone modem. Geospatial location of the subscriber 6 along with date and time information can either be sent as a result of a subscriber query or can be sent continuously by an application in the subscriber's 6 wireless device or by any device that can be attached by wired network or phone line. The geospatial location along with date and time information of the subscriber 6 can be determined by the subscriber's 6 device using GPS, cellular triangulation or other geospatial location, date and time locating methods. Wired or wireless networks 11 can also provide the geospatial location information, along with date and time information of a subscriber's device.

An application on a subscriber's 6 mobile or wireless device can allow the subscriber 6 to provide additional information, such as narrative information, about the subscriber's 6 current geospatial at a given date and time. For example, a school bus stop or places where children gather are typically off limits for pedophiles. Such locations tend to be dynamic over time such that they are unknown to supervising agencies 10 when those agencies establish off limit areas or exclusion zones in the monitoring systems of a criminal justice supervising agency 3 or contracted company 4 and offender monitoring devices such as land line telephones 17, cellular phones 18, pagers 19, and offender-worn devices 20. By receiving such information from subscribers 6, supervising agencies 10 can dynamically update off limit areas or exclusion zones for pedophiles in either the criminal justice supervising agency 3 or contracted company 4 systems and/or clearinghouse 1. Further, by allowing subscribers 6 to enter dynamic locations with a narrative description, and submit the information to supervising agencies 10 via the clearinghouse the supervising agency 10 can evaluate these locations and better monitor and enforce sentences. The supervising agency can continuously update off limit areas in criminal justice supervising agency 3 or contracted company 4 monitoring systems and in the supervised released criminal offender's devices.

Subscriber 6 can then be notified if there is released criminal offender 5 within a predefined proximity or distance range and time interval entered by the subscriber 6. Subscriber 6 can receive such a notification in a timely fashion for those supervised released criminal offenders 5 that have continuous wireless reporting devices. For supervised released criminal offenders 5 with batch reporting devices, a message either by text or email can be sent to the subscriber 6 as soon as the date stamped and time stamped geospatial location information for a released criminal offender 5 matching the subscriber's 6 prior query is subsequently identified by the clearinghouse 1 when the supervised released criminal offender's 5 data arrives at clearinghouse 1. Whenever the clearinghouse 1 notifies a subscriber 6 through a report, clearinghouse 1 can also report the same, less, or more extensive information to the supervising agency 10. Clearinghouse 1 can also log the occurrence(s) in a data base of clearinghouse 1 with an incident identifier for ongoing or subsequent trend analysis and evaluation by the criminal justice supervising agency 10, clearinghouse 1, or any other appropriate entity with access to the necessary data, such as incident identifiers.

In one embodiment, when clearinghouse 1 identifies a trend of stalking behavior by a released criminal offender 5, clearinghouse 1 may report the trend or a potential violation to subscriber 6, criminal justice supervising agency 10, probation and parole officers 100 and/or law enforcement 14. Either the criminal justice supervising agency 10, probation and parole officers 100, law enforcement 14 or clearinghouse 1 can send information to law enforcement officers 15 or law enforcement vehicles 16 near the current geospatial location of subscriber 6. The location of law enforcement officers 15 or law enforcement vehicles 16 can be determined using a variety of technologies, including GPS and Automatic Vehicle Locations (AVL), and any other appropriate location technology as would be apparent to one of skill in the art upon reading this disclosure. The information can also be sent to live chat operators 71 and E911 dispatch 70. Law enforcement vehicles 16 may have one or more wireless devices which clearinghouse 1 can use for collecting law enforcement officer 15 or vehicle 16 geospatial location information, including date and time information, and for sending information. Clearinghouse 1 also sends a warning to a wired or wireless device with the subscriber 6. Subscriber 6 can also subscribe to continuous updates and be notified whenever a released criminal offender 5 is in the area or within a predefined proximity of subscriber 6.

Figure 2:
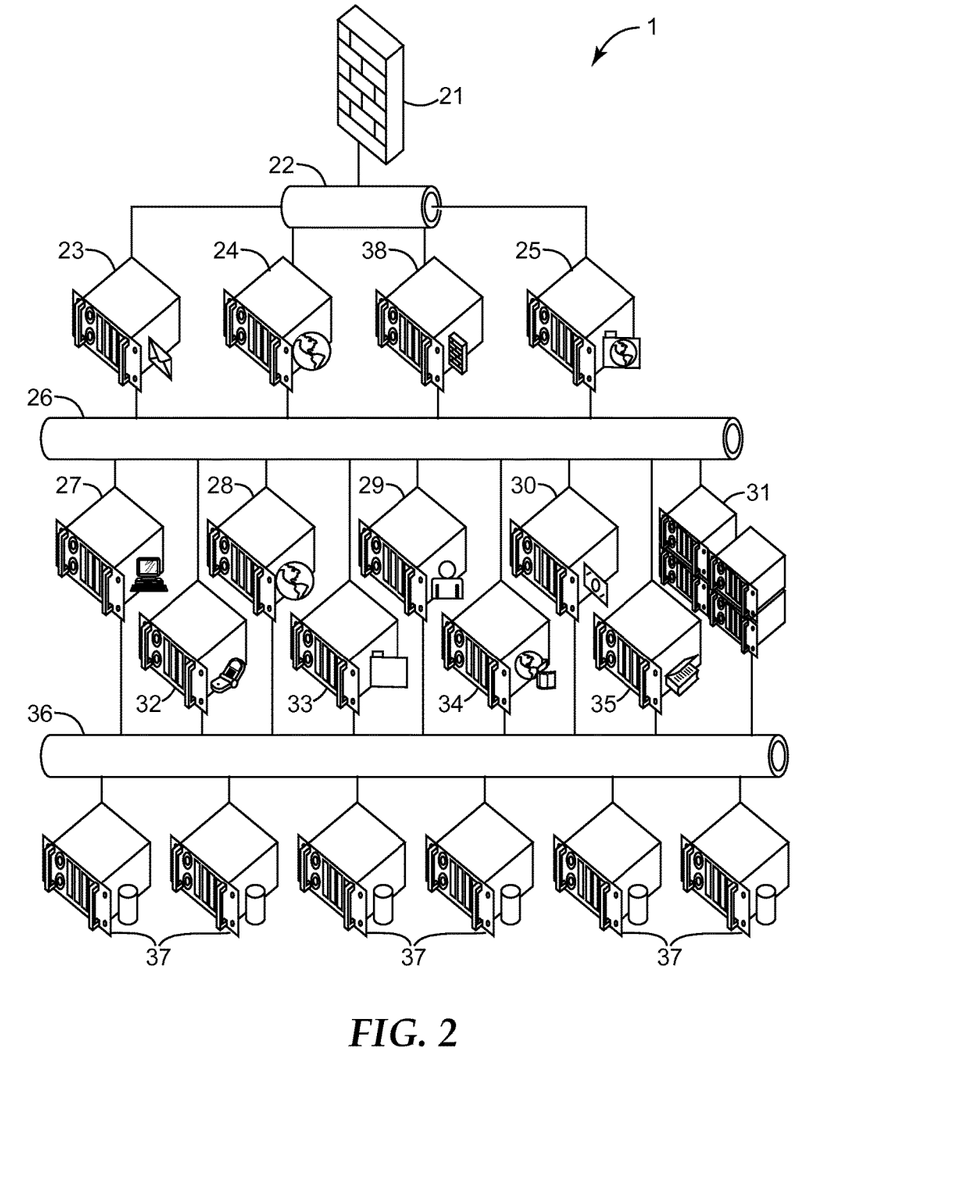
FIG. 2 is a diagram illustrating an exemplary computer architecture for a clearinghouse.

FIG. 2 depicts an exemplary computer architecture for a clearinghouse including a detailed architecture of tiered service components in a traditional Service Oriented Architecture (SOA) implementing end to end transactions as threads of services. While FIG. 2 shows a particular configuration for server architecture, any appropriate configuration consistent with the scope of the present disclosure can be used to construct a server architecture for clearinghouse 1. In the illustrated embodiment, clearinghouse 1 provides Software as a Service (SaaS) as known in the art for cloud computing. Although FIG. 2 depicts all of the server components in one location, the architecture can be distributed, clustered and federated across the internet. Distributed server architectures provide availability should a portion of the internet or a server location suffer congestion or an infrastructure outage. Clustered server architectures can provide availability, manageability and scalability. Federated server architectures provide allows processing load to be shared and partitioned amongst multiple servers, thereby increasing throughput. Therefore the distributed, clustered and federated architecture of the clearinghouse SOA architecture disclosed herein provides the advantages of being scalable, reliable and high performance.

In the illustrated embodiment, the top tier of the clearinghouse 1 architecture interfaces with internet 2 via firewalls 21. Firewalls 21 can be configured in any arrangement known in the art of interned based information processing and e-commerce. Firewalls 21 protect the clearinghouse 1 from such things as denial of service attacks, unauthorized user access and the infusion or injection of viruses as known in the art into the operating systems and applications executing in/on servers behind the firewalls 21.

The first tier sub-network 22 interfaces the servers that provide standard Internet services such as e-mail, websites, device communication gateways and file transfer protocol (FTP). The e-mail servers 23 can provide email services to a variety of entities, including subscribers 6, supervising agencies 10, probation and parole officers 100, law enforcement officers 14, 15 and vehicles 16, E911 dispatch 70, live chat operators 71, e-commerce servers 30 and the application servers 31. Web servers 24 can host the web services that provide the browser services between the application servers 31 and the other components or users of an end to end system such as subscribers 6, supervising agencies 10, probation and parole officers 100, and law enforcement officers 14, 15 and vehicles 16. The FTP servers 25 can provide file transfer services to subscribers 6, supervising agencies 10, law enforcement officers 14, 15 and vehicles 16, E911 dispatch 70, live chat operators 71 and criminal justice supervising agency and contracted company 4 monitoring systems. The gateway servers 38 can provide the advantages of availability, high throughput and assured delivery of data for subscribers 6, supervising agencies 10, probation and parole officers 100, supervising criminal justice agency 3 and contracted company 4 monitoring systems and law enforcement officers 14,15 and vehicles 16 to and from clearinghouse 1. The gateway servers 38 can provide flow control by sending UDP packets with updated lists of gateway server 38 IP addresses to prevent congestion or to route around gateway outages.

The $2^{nd}$ tier sub network 26 interfaces any business logic implemented in servers 27, 28, 29 30, 31, 32, 33, 34, 35 to the web services on the first tier web servers 23, 24, 38 and 25. Management servers 27 manage resources and monitor and control performance for the business logic tier, especially congestion on the real time gateway servers 38. Geospatial information servers 28 provide translation between coordinates of latitude and longitude, postal address layers, map layers and other feature layers for the business logic tier. Real time communication servers 29 provide the services for chat, text messaging, voice, and graphics for the business logic tier. E-commerce servers 30 provide E-commerce services for subscribers 6 supervising agencies 10, probation and parole officers 100, and law enforcement officers 14, 15 and vehicles 16 regarding accounting for the services provided. Application servers 31 provide a plurality of application services for the clearinghouse 1, subscribers 6, supervising agencies 10, probation and parole officers 100, E911 dispatch 70, operator chat 71 and law enforcement officers 14, 15 and vehicles 16. Application servers 31 provide the custom applications that implement the business logic for the clearinghouse 1. Mobile information servers 32 maintain attribute information specific to portable wireless devices, such as PDA 7, cellular phone 8, and laptop computer 9, and format the data for the wireless devices. File servers 33 maintain the application files that are uploaded and downloaded between the components of the end to end system and provide XML services for data format conversion, encoding and decoding. Streaming media servers 34 deliver image data, streaming audio and streaming video content to portable wireless devices and wired devices with law enforcement officers 14, supervising agencies 10, E911 dispatch 70 and live chat operators 71. Directory servers 35 maintain a directory of components, in the end to end system. Temporary variables and service thread attributes for tier 2 servers can be stored locally on the respective servers, thereby not competing for data base servers 37, and additionally providing a stateless architecture eliminating single points of failure for process threads in the servers of the clearinghouse 1. In the illustrated configuration, this is possible because the SOA transactions are data driven, and data loss is unlikely due to assured delivery end to end by acknowledgements at gateway servers 38 and application servers 31. Therefore any unacknowledged or negatively acknowledged service thread is restarted once the TTL (Time To Live) timeout occurs.

The third tier sub network 36 interfaces the business logic in the second tier to the clustered and federated data base servers 37. The data base servers 37 provide the usual and customary functions of storage, retrieval, updating and archiving of all data in the clearinghouse 1.

EXAMPLES

Figure 3:
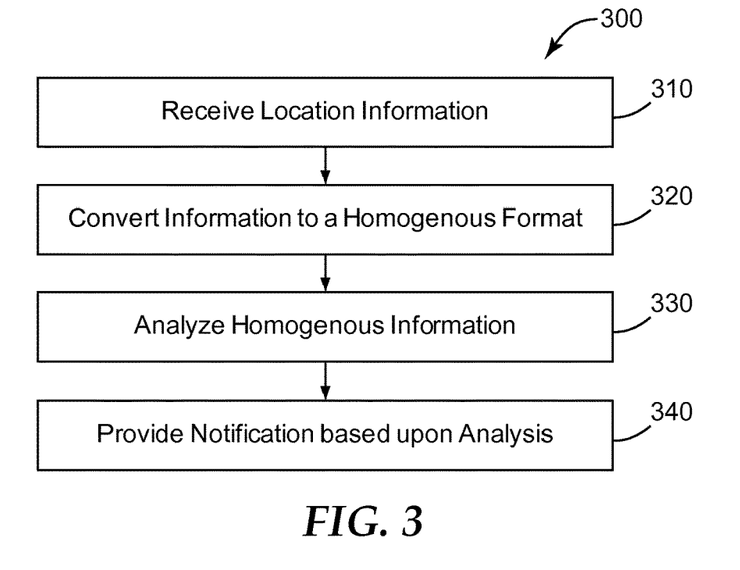
FIG. 3 illustrates an exemplary workflow for a clearinghouse.
Figure 4:
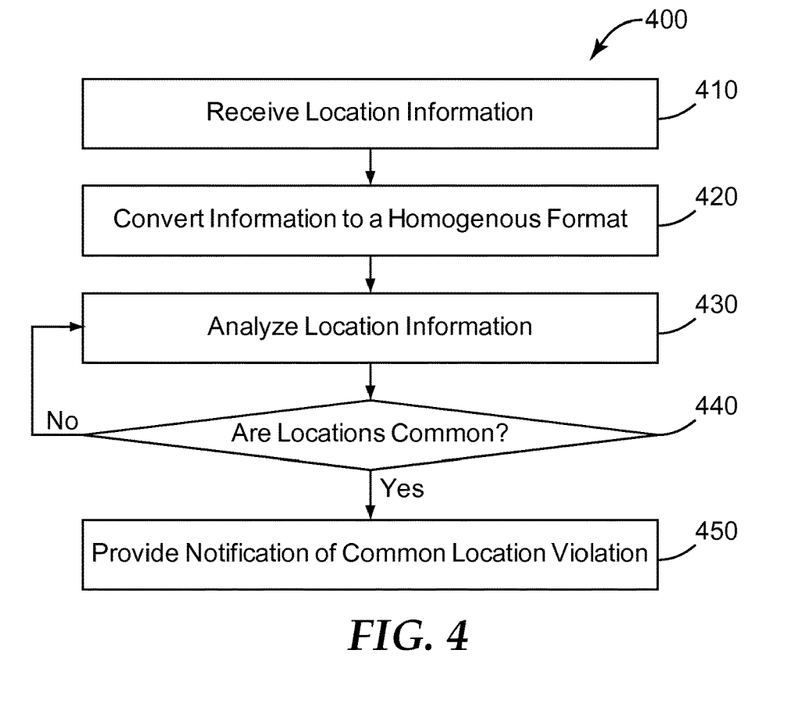
FIG. 4 illustrates an exemplary workflow for notification generation of the clearinghouse when determining if offenders monitored by disparate systems are associating or are in proximity to each other.

FIGS. 3 and 4 depict various exemplary work flows associated with a clearinghouse consistent with the present disclosure. While the exemplary work flows show particular scenarios and ways in which a clearinghouse can interact with data, individuals, devices, and ways in which the clearinghouse can operate, permutations and variations on these examples will be apparent to one of skill in the art upon reading the present disclosure. The various steps and devices shown in and discussed in the context of each of the Figures can be adapted to meet other particular use cases and work flows. Further, steps and devices shown in the Figures may be combined in variety of ways; the Figures are only intended to illustrate a sampling of the possible processes and communication routes made possible by the present disclosure. Finally, as technology evolves, some of the processes or steps shown in the Figures may become unnecessary or obsolete; however, the scope of the inventive concepts disclosed and claimed herein will still be understood by those of skill in the art.

FIG. 3 represents an exemplary work flow 300 of clearinghouse 1 as shown in FIG. 1. The process outlined in FIG. 3 outlines an exemplary path through the tiered, clustered, and federated sub-networks 22, 26, 36 in which a clearinghouse interacts with data, individuals, and devices. Permutations on these examples and the incorporation of evolving technology will be apparent to one of skill in the art upon reading the present disclosure. The steps shown in FIG. 3 are exemplary. Not all steps may be required and in some instances, additional steps not illustrated in FIG. 3 may be performed by clearinghouse 1. Among other functions, clearinghouse 1 can receive, convert, analyze, store, notify, report, and overlay geospatial location and other defined information including: criminal records, demographic information, and sentence guidelines. Inclusion of other information will be apparent to one of skill in the art.

As shown in step 310 of FIG. 3, clearinghouse 1 first receives offender 5 or other user location information. Other users include, but are not limited to: subscribers 6 and law enforcement personnel 14, 15 and vehicles 16. Such information can be geospatial information also including time and date. Depending on the monitoring device used by the offender 5 or the user providing data to clearinghouse 1, clearinghouse 1 may receive data in different ways. For example, if an offender 5 is wearing a criminal offender tracking device 20 with GPS and communication capabilities, the criminal offender tracking device 20 may be configured to connect directly to the clearinghouse 1. In such a situation, the device may transmit real time or historic geospatial information including date and time information to the clearinghouse 1 via a wired or wireless connection. If an offender 5 is wearing a criminal offender tracking device 20 with GPS capabilities, but is not connected to the clearinghouse, a supervisory agency 3 or contracted company 4 receiving data including geospatial location information from the criminal offender tracking device may transmit the information to the clearinghouse 1 via a wired or wireless connection. The information may be transmitted as historic information or in real time. If an offender 5 or user does not have a tracking device with GPS capabilities, the offender 5 may be required to directly inform a supervising agency 3, contracted company 4, or other user of historic or real time geospatial location information, including date and time information. In that instance, the supervising agency 3, contracted company 4, or other user may then provide such information directly to the clearinghouse 1. System users not wearing tracking devices may directly interact with clearinghouse 1 through the use of cellular phones 8, laptop computers 9, personal digital assistants (PDA) 7, or other personal communication devices.

Supervising agencies 3, contracted companies 4, offenders 5, law enforcement 14, 15, and subscribers 6 interact with clearinghouse 1 through user interfaces on subscriber devices 7, 8, 9 or other devices. The use interfaces indicate how clearinghouse 1 should respond when definition is provided by a supervising agency contracted company 4, law enforcement 14, 15, or subscriber 6. As an example, information may be received from the subscriber 6 that clearinghouse 1 should notify the subscriber 6 when the offender 5 is within a defined location or time period from the subscriber 6. Clearinghouse 1 may also receive offender 5 violation and sentencing guidelines from supervising agencies 3, contracted companies 4, law enforcement 14, 15 or directly from the offender tracking device 20. The clearinghouse 1 will thus be instructed through a subscriber 6 user interface to analyze current movement of offender 5 and transmit notifications and offender 5 information, including location, to the subscriber 6. Reception of data to clearinghouse 1 may be facilitated via the monitoring of a standard interact service 220 as described in FIG. 2, Subscribers, offenders, or other system users interact with the clearinghouse 1 through standard internet services 220 providing information in various formats (email, web applications or other file transfer protocols). Received information along with business logic services 230 that manage the standard internet service 220 as defined in FIG. 2 are stored for retrieval, updating, and/car archiving in clearinghouse 1 in clustered and federated database servers 37.

Once clearinghouse 1 receives offender 5 or other user location information as shown in step 310, clearinghouse 1 then converts the received information to a homogenous format as shown in step 320. The process of converting received information into a homogenous format enhances analysis and data comparison as defined in step 330. For example, based on the variation of pathways that clearinghouse 1 is able to receive information, an offender 5 and a subscriber 6 transmit geospatial location information including date and time to clearinghouse 1. As one example of transmission of specific information, location information from the offender 5 may be wirelessly transmitted through an offender tracking device 20 and be received by the clearinghouse 1 as GPS coordinates of 38°24'19.45" N 122°6'2.34" W with a date and time of 2011 Sep. 23 16:41:28. Information from the subscriber 6 may be wirelessly transmitted through a subscriber tracking device 7, 8, 9 and be received in the clearinghouse 1 as GPS coordinates 38°25.380' N 122° 6.140' W with a date and time of Sep. 23, 2011 4:41:28 PM. In step 320, clearinghouse 1 through the use of business logic services 230 converts the offender 5 and subscriber 6 information into a homogenous format. Offender 5 GPS information is formatted from degrees-minutes-seconds to degrees-decimal-minutes via the geospatial information server 28. Subscriber 6 date information is formatted from middle to big endian form and time information is formatted from the 12-hour to the 24-hour clock. Offender 5 information becomes 38°24.324' N 122°6.039' W with a date and time of 2011 Sep. 23 16:41:28. Subscriber 6 information becomes 38°25.380' N 122°6.140' W with a date and time of 2011 Sep. 23 16:41:28.

Homogenous information conversion within clearinghouse 1 may occur on single or multiple portions of the received information including but not limited to: geospatial, time and date, demographic, criminal records, and sentence guidelines. Conversion may be accomplished through multiple format variations such as text to text, number to text, text to number, or embedded text in an image to text. Variations and permutations will be apparent to one of skill in the art. Converted information is stored in clustered and federated databases 37 for further analysis.

In step 330, clearinghouse 1 analyzes and compares homogenous information through the use of the tiered server architecture. Business logic services 230 and the clustered and federated database servers 37 as described in FIG. 2 provide reliable and optimal assessment of homogenous information based upon user or system specific application procedures. As was captured in step 310, offender 5 or other user sentence guidelines, criminal record, demographic, and notification procedures are received by clearinghouse 1. Real-time or historic offender 5 information is compared against defined user interface requests as received by supervising agencies 3, contracted companies 4, or subscribers 6 to detect offender 5 violations. For example, a supervising agency 3 may define and transmit a user interface request to clearinghouse 1 based on a sentence that an offender 5 may be not be within a certain distance of subscriber 6. Clearinghouse 1 analyzes the location of offender 5 in relation to the location of subscriber 6 as well as information received regarding sentencing guidelines from a supervising agency 3 or contracted company 4. Analysis may be graphical where overlay images of the offender 5 and subscriber 6 locations are compared with a distance defined perimeter around the subscriber 6. When the offender 5 enters the defined perimeter, clearinghouse 1 will respond with notification as outlined in Step 340. Offender 5 violations may be detected in real-time or after time has elapsed from an occurrence as analyzed information is stored for retrieval in the clustered and federated database servers 37. Sentencing guidelines or other offender 5 restrictions are not limited specifically to distance from a user and analysis may be graphical, textual, or tabular. Analytical variations will be apparent to one of skill in the art.

Based upon analytical conditions and results, clearinghouse 1 provides notification to system users as shown in step 340. Supervising agencies 3, contracted companies 4, law enforcement personnel 14, 15 and vehicles 16, and subscribers 6 receive information related to violations from clearinghouse 1 in the form of notifications and reports. Violations may be defined by system users as real-time offender 5 criminal activity or reports that describe criminal historic behavior or suspected activities. Notifications may be transmitted in real-time or are sent when requested by system users. Upon meeting the conditions of a violation that are received, converted, and defined by a supervising agency 3, contracted company 4, law enforcement personnel 14, 15, or subscriber 6, clearinghouse 1 transmits a notification to a system user via processes outlined in the business logic service 230 in FIG. 2. For example, subscriber 6 transmits information to clearinghouse 1 to be notified of location, criminal record, and demographic details when offender 5 is within a defined distance. Upon analysis and determining that offender 5 is within the predefined distance from the subscriber 6, clearinghouse 1 transmits an email notification to subscriber cellular phone 8 that contains offender 5 identification information including name and criminal record as well as location of offender 5. Notification messages may be transmitted in predefined time periods such as less than one minute from determining an offender 5 is within a proximity to subscriber 6. Notifications may also be transmitted on a recurring schedule basis such as every 24 hours. Variations of the time periods will be apparent to one of skill in the art.

Notifications may be transmitted directly to a subscriber tracking device 7, 8, 9 in textual format via SMS or email, graphically as maps or overlay images, streaming media by voice or video chatting, or through other communication conduits apparent to one of skill in the art. Violation information may be transmitted to supervising agencies 3, contracted companies 4, law enforcement personnel 14, 15 and vehicles 16 directly through the clearinghouse 1 via the internet 2 or telephone correspondence. Notifications may consist of offender 5 location, criminal record or activity, sentencing guidelines, or other demographic information as specific or requested. Variation and permutations of notification format will be apparent to one of skill in the art. Clearinghouse 1 enables multiple supervising agencies 3, contracted companies 4, or law enforcement personnel 14, 15 connected to clearinghouse 1 to share information including violations and notifications among other criminal justice or law enforcement agencies and companies.

Notifications may also be sent to law enforcement personnel 15 or vehicles 16 near the location of the offender 5 violation for assessment. For example, clearinghouse 1 reports a violation on offender 5 based upon supervising agency 3 received information. Contained within the received information is instruction to notify law enforcement when the defined violation occurs. Clearinghouse 1 will determine and compare the location of offender 5 with law enforcement personnel 15 or vehicles 16. Notification will be transmitted to law enforcement personnel 15 or vehicles 16 that are closest to offender 5 through text message, email, or voice.

FIG. 4 represents another exemplary work flow 400 of clearinghouse 1 as shown in FIG. 1. The process outlined in FIG. 4 outlines an exemplary path through the tiered, clustered, and federated sub-networks 22, 26, 36 in which a clearinghouse interacts with data, individuals, and devices. Permutations on these examples and the incorporation of evolving technology will be apparent to one of skill in the art upon reading the present disclosure. The steps shown in FIG. 4 are exemplary. Not all steps may be required and in some instances, additional steps not illustrated in FIG. 4 may be performed by clearinghouse 1. Among other functions, clearinghouse 1 can receive, convert, analyze, store, notify, report, and overlay geospatial location and other defined information including: criminal records, demographic information, and sentence guidelines. Inclusion of other information will be apparent to one of skill in the art.

As shown in step 410 of FIG. 4, clearinghouse 1 first receives offender 5 or other user location information. Other users include, but are not limited to: subscribers 6 and law enforcement personnel 14, 15 and vehicles 16. Such information can be geospatial information also including time and date. Depending on the monitoring device used by the offender or the user providing data to clearinghouse 1, clearinghouse 1 may receive data in different ways. For example, if an offender 5 is wearing a criminal offender tracking device 20 with OPS and communication capabilities, the criminal offender tracking device 20 tray be configured to connect directly to the clearinghouse 1. In such a situation, the device may transmit real time or historic geospatial information including date and time information to the clearinghouse 1 via a wired or wireless connection. If an offender 5 is wearing a criminal offender tracking device 20 with UPS capabilities, but is not connected to the clearinghouse, a supervisory agency 3 or contracted company 4 receiving data including geospatial location information from the criminal offender tracking device may transmit the information to the clearinghouse 1 via a wired or wireless connection. The information may be transmitted as historic or in real time. If an offender 5 or user does not have a tracking device with GPS capabilities, the offender 5 may be required to directly inform a supervising agency 3, contracted company 4, or other user of historic or real time geospatial location information, including date and time information. In that instance, the supervising agency 3, contracted company 4, or other user may then provide such information directly to the clearinghouse 1. System users not wearing tracking devices may directly interact with clearinghouse 1 through the use of cellular phones 8, laptop computers 9, personal digital assistants (PDA) 7, or other personal communication devices.

Supervising agencies 3, contracted companies 4, law enforcement 14, 15, offenders 5, and subscribers 6 interact with clearinghouse 1 to create user interface procedures. User interface requests and procedures indicate how clearinghouse 1 should respond when definition is provided by a supervising agency 3, contracted company 4, law enforcement 14, 15, or subscriber 6. As an example, information may be received from the supervising agency 3, contracted company 4, or law enforcement 14, 15 that clearinghouse 1 should notify the supervising agency 3, contracted company 4, or law enforcement 14, 15 when two offenders 60, 61 who are monitored by separate supervising agencies 3 or contracted companies 4 are within a defined location or time period e.g., proximity from each other. Supervised released offenders 60, 61 may be the same supervised offenders 5 referenced in context and other figures of this invention and the number of monitored offenders may be greater than two. Clearinghouse 1 may also receive offender 60, 61 violation and sentencing guidelines from supervising agencies 3, contracted companies 4, law enforcement 14, 15 or directly from the offender tracking device 20. The clearinghouse 1 will thus be instructed through user interface requests to analyze the current offender 60, 61 locations. Reception of data to clearinghouse 1 may be facilitated via the monitoring of a standard internet service 220 as described in FIG. 2. Subscribers, offenders, or other system users interact with the clearinghouse 1 through standard internet services 220 providing information in various formats (email, web applications or other file transfer protocols). Received information along with business logic services 230 that manage the standard internet service 220 as defined in FIG. 2 are stored for retrieval, updating, and/or archiving is clearinghouse 1 in clustered and federated database servers 37.

Once clearinghouse 1 receives offender 60, 61 or other user location information as shown in step 410, clearinghouse 1 then converts the received information to a homogenous format as shown in step 420. The process of converting received information into a homogenous format enhances analysis and data comparison as defined in step 430. For example, based on the variation of pathways that clearinghouse 1 is able to receive information, two offenders 60, 61 transmit geospatial location information including date and time to clearinghouse 1. As one example of transmission of specific information, location information from offender 60 may be wirelessly transmitted through an offender tracking device 20 and be received by the clearinghouse 1 as GPS coordinates of 38°24'19.45" N 122°6'2.34" W with a date and time of 2011 Sep. 23 16:41:28. Information from another offender 61 may be wirelessly transmitted through a offender tracking device 20 and be received in the clearinghouse 1 as GPS coordinates 38° 25.380' N 122°6.140' W with a date and time of Sep. 23, 2011 4:41:28 PM. In step 420, clearinghouse 1 through the use of business logic services 230 converts offender 60, 61 information into a homogenized format. The first offender 60 GPS information is formatted from degrees-minutes-seconds to degrees-decimal minutes via the geospatial information server 28. The second offender 61 date information is formatted from middle to big endian form and time information is formatted from the 12-hour to the 24-hour clock. The first offender 60 information becomes 38°24.324' N 122°6.039' W with a date and time of 2011 Sep. 23 16:41:28. The second offender 61 information becomes 38°25.380' N 122°6.140' W with a date and time of 2011 Sep. 23 16:41:28.

Homogenous information conversion within clearinghouse 1 may occur on single or multiple portions of the received information including but not limited to: geospatial, time and date, demographic, criminal records, and sentence guidelines. Conversion may be accomplished through multiple format variations such as text to text, number to text, text to number, or embedded text in an image to text. Variations and permutations will be apparent to one of skill in the art. Converted information is stored in clustered and federated databases 37 as outlined in FIG. 2 for further analysis.

In step 430, clearinghouse 1 analyzes and compares homogenous information through the use of the tiered server architecture. Business logic services 230 and the clustered and federated database servers 37 as mentioned in FIG. 2 provide reliable and optimal assessment of homogenous information based upon user or system specific application procedures. As was captured in step 410, offender 60, 61 or other user sentence guidelines, criminal record, demographic, and notification procedures are received by clearinghouse 1. Real-time or historic offender 60, 61 information is compared against defined user interface requests as received by supervising agencies 3, contracted companies 4, or subscribers 6 to detect offender 60, 61 violations. For example, a supervising agency 3 may define and transmit a user interface request or procedure to clearinghouse 1 based on a sentence that an offender 60 may be not be within a certain distance e.g., proximity of another offender 61. Clearinghouse 1 analyzes the location of offender 60 in relation to the location of offender 61 as well as information received regarding sentencing guidelines from a supervising agency 3 or contracted company 4. Analysis may be textual or graphical where overlay images of the offender 60 and offender 61 locations are compared with a predefined distance or time based parameter.

The clearinghouse 1, in 440 of FIG. 4, would determine if the location of the two offenders 60, 61 are common with respect to the predetermined time or distance. Common location may be defined as within proximity based upon time or distance. As an example, clearinghouse 1 would receive information from supervising agencies 3, contract companies 4, or law enforcement 14, 15 to notify when the two offenders 60, 61 are less than or equal to 50 radial meters from each other. In other words, if one offender 60 is considered a point, then clearinghouse 1 will provide notification when the other offender 61 is within a radius of 50 meters from the other, if the two locations are common, notification is sent in 450. If the two locations are not common, clearinghouse 1 will continue to analyze location information as outlined in step 430.

When the offender 60 enters the defined perimeter, clearinghouse 1 can respond with notification as outlined in Step 450. Offender 60, 61 violations may be detected in real-time or after time has elapsed from an occurrence as analyzed information is stored for retrieval in the clustered and federated database servers 37. Sentencing guidelines or other offender 5 restrictions are not limited specifically to distance from a user and analysis may be graphical, textual, or tabular. Analytical variations will be apparent to one of skill in the art.

Based upon analytical conditions and results, clearinghouse 1 provides notification to system users as shown in step 450. Supervising agencies 3, contracted companies 4, law enforcement personnel 14, 15 and vehicles 16, and subscribers 6 receive information related to violations from clearinghouse 1 in the form of notifications and reports. Violations may be defined by system users as real-time offender 5 criminal activity or reports that describe criminal historic behavior or suspected activities. Notifications may be transmitted in real-time or are sent when requested by system users. Upon meeting the conditions of a violation that are received, converted, and defined by a supervising agency 3, contracted company 4, law enforcement personnel 14, 15, or subscriber 6, clearinghouse 1 transmits a notification to a system user via processes outlined in the business logic service 230 in FIG. 2. For example, supervising agency 3, contracted company 4, or law enforcement 14, 15 transmits information to clearinghouse 1 to be notified of location, criminal record, and demographic details when offender 60 is within a defined distance from offender 61. Upon analysis and determining that offender 60 is within the predefined distance from offender 61, clearinghouse 1 transmits an email notification to supervising agency 3, contract company 4, or law enforcement 14, 15 that contains the offenders 60, 61 identification information including name and criminal record as well as location of offenders 60, 61. Notification messages may be transmitted in predefined time periods such as less than one minute from determining an offender 60 is within proximity to offender 61. Notifications may also be transmitted on a recurring schedule basis such as every 24 hours. Variations of the time periods will be apparent to one of skill in the art.

Notifications may be transmitted directly to a subscriber tracking device 7, 8, 9 in textual format via SMS or email, graphically as maps or overlay images, streaming media by voice or video chatting, or through other communication conduits apparent to one of skill in the art. Violation information may be transmitted to supervising agencies 3, contracted companies 4, law enforcement personnel 14, 15 and vehicles 16 directly through the clearinghouse 1 via the internet 2 or telephone correspondence. Notifications may consist of offender 60, 61 location, criminal record or activity, sentencing guidelines, or other demographic information as specific or requested. Variation and permutations of notification format wilt be apparent to one of skill in the art. Clearinghouse 1 enables multiple supervising agencies 3, contracted companies 4, or law enforcement personnel 14, 15 connected to clearinghouse 1 to share information including violations and notifications among other criminal justice or law enforcement agencies and companies.

Notifications may also be sent to law enforcement personnel 15 or vehicles 16 near the location of the offenders 60, 61 proximity violations for assessment. For example, clearinghouse 1 reports a violation on offender 60, 61 based upon supervising agency 3 received information. Contained within the received information is instruction to notify law enforcement when the defined violation occurs. Clearinghouse 1 will determine and compare the locations of offenders 60, 61 with law enforcement personnel 15 or vehicles 16. Notification will be transmitted to law enforcement personnel 15 or vehicles 16 that are closest to offender 5 through text message, email, or voice.

Although the present disclosure has been described with reference to preferred embodiments, those of skill in the art will recognize that changes may be made in form and detail without departing from the spirit and scope of the present disclosure.

What is claimed is:

1. A computing device comprising:
   a processor; and
   a memory comprising instructions that when executed by the processor cause the processor to:
   receive geospatial location information from a first criminal justice supervising agency that collects first geospatial location information generated criminal offender tracking devices worn by a first group of released criminal offenders and a second criminal justice supervising agency that collects second geospatial location information generated by criminal offender tracking devices worn by a second group of released criminal offenders, wherein the received geospatial location information includes date and time information and latitude/longitude information;
   receive narrative information from one or more past or potential victims that indicate one or more dynamic locations that the released criminal offenders are prohibited from being physically proximate to based on their sentences, wherein the dynamic locations are not preprogrammed into the computing device when the sentences are initially stored in the computing device;
   in response to determining that the received geospatial location information includes latitude/longitude information in different formats, convert at least the latitude/longitude information of the received geospatial location information to a homogenous latitude/longitude format;
   receive the sentences from a criminal justice agency;
   determine, based at least in part on the narrative information for at least one of the dynamic locations, the sentences, and the latitude/longitude information in the homogenous latitude/longitude format, whether a location of a particular criminal offender violates a sentence of the particular criminal offender; and
   responsive to determining that the location of the particular criminal offender violates the sentence of the particular criminal offender, output a notification indicating the location of the particular criminal offender violates the sentence of the particular criminal offender; and
   wherein the processor is configured to compare the information of criminal offenders from the first criminal justice supervising agency and criminal offenders of the second criminal justice supervising agency to identify criminal offenders from separate criminal justice supervising agencies that are within a predefined distance from each other and provide a notification of such an occurrence.

2. The computing device of claim 1, wherein the instructions cause the processor to receive at least one of: criminal records or demographic information for a released criminal offender from the criminal justice agency.

3. The computing device of claim 2, wherein the instructions cause the processor to receive the sentences, criminal records, or demographic information directly from the criminal justice agency.

4. The computing device of claim 1, wherein the instructions cause the processor to determine whether the location of the particular criminal offender violates the sentence of the particular criminal offender in real time.

5. The computing device of claim 1, wherein the instructions cause the processor to determine whether the location of the particular criminal offender violates the sentence of the particular criminal offender post mortem.

6. The computing device of claim 1, wherein the instructions cause the processor to output the notification to the criminal justice agency.

7. The computing device of claim 1, wherein the instructions further cause the processor to request the geospatial location information from a first criminal offender tracking device of a first system and a second criminal offender tracking device of a second system different from the first system.

8. The computing device of claim 1, wherein the instructions further cause the processor to store the geospatial location information in response to receiving the geospatial location information.

9. The computing device of claim 1, wherein the instructions further cause the processor to track information related to the location of law enforcement officers and output the notification to a law enforcement officer near the location of the first criminal offender.

10. The computing device of claim 1, wherein the instructions further cause the processor to enable multiple criminal justice agencies to share information related to released criminal offenders with other criminal justice agencies.

11. The computing device of claim 1, wherein the computing device comprises a tiered server architecture.

12. The computing device of claim 11, wherein the server architecture is clustered for reliability and fault tolerance.

13. The computing device of claim 11, wherein the server architecture is federated for performance.

14. The computing device of claim 11, wherein the server architecture is distributed for high availability.

15. The computing device of claim 1, wherein the received geospatial location information includes:
 first latitude/longitude information that is formatted in a first format and is generated by a first criminal offender tracking device worn by a first criminal offender; and
 second latitude/longitude information that is formatted in a second format different from the first format and is generated by a second criminal offender tracking device worn by a second criminal offender.

16. The computing device of claim 15, wherein the first latitude/longitude information is formatted as degrees-minutes-seconds and the second latitude/longitude information is formatted as degrees-decimals-minutes.

17. A method comprising:
 receiving, by a computing device, geospatial location information from a first criminal justice supervising agency that collects first geospatial information generated by criminal offender tracking devices worn by a first group of released criminal offenders and a second criminal justice supervising agency that collects second geospatial location information generated by criminal offender tracking devices worn by a second group of released criminal offenders, wherein the received geospatial location information includes date and time information and latitude/longitude information;
 receiving narrative information from one or more past or potential victims that indicate one or more dynamic locations that the released criminal offenders are prohibited from being physically proximate to based on their sentences, wherein the dynamic locations are not preprogrammed into the computing device when the sentences are initially stored in the computing device;
 in response to determining that the received geospatial location information includes latitude/longitude information in different formats, converting, by the computing device, at least the latitude/longitude information of the received geospatial location information to a homogenous latitude/longitude format;
 receiving, by the computing device, sentences from a criminal justice agency;
 determining, by the computing device, based at least in part on the narrative information for at least one of the dynamic locations, the sentences, and the latitude/longitude information in the homogenous latitude/longitude format, whether a location of a particular criminal offender violates a sentence of the particular criminal offender;
 responsive to determining that the location of the particular criminal offender violates the sentence of the particular criminal offender, outputting, by the computing device, a notification indicating the location of the particular criminal offender violates the sentence of the particular criminal offender; and
 comparing the information of criminal offenders from the first criminal justice supervising agency and criminal offenders of the second criminal justice supervising agency to identify criminal offenders from separate criminal justice supervising agencies that are within a predefined distance from each other and provide a notification of such an occurrence.

18. The method of claim 17, wherein determining whether the location of the particular criminal offender violates the sentence of the particular criminal offender comprises determining whether the location of the particular criminal offender violates the sentence of the particular criminal offender in real time.

19. The method of claim 17, wherein determining whether the location of the particular criminal offender violates the sentence of the particular criminal offender comprises determining whether the location of the particular criminal offender violates the sentence of the particular criminal offender post mortem.

20. The method of claim 17, wherein outputting the notification comprises outputting the notification to a criminal justice agency, a law enforcement agency or a subscriber.

21. The method of claim 17, further comprising requesting the geospatial location information from a first criminal offender tracking device of a first system and a second criminal offender tracking device of a second system different from the first system.

22. The method of claim 21, further comprising storing the geospatial location information in response to receiving the geospatial location information from the first and second criminal offender tracking devices.

* * * * *